(12) United States Patent
Wang

(10) Patent No.: US 7,889,390 B2
(45) Date of Patent: Feb. 15, 2011

(54) SYSTEM AND METHOD FOR THE GENERATION OF CORRELATION-BASED DIGITAL WATERMARKS USING UNIFORM-ROSETTE COLOR HALFTONING

(75) Inventor: Shen-Ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 551 days.

(21) Appl. No.: 12/036,481

(22) Filed: Feb. 25, 2008

(65) Prior Publication Data

US 2009/0213430 A1 Aug. 27, 2009

(51) Int. Cl.
*H04N 1/52* (2006.01)
*B41M 3/10* (2006.01)

(52) U.S. Cl. .................. 358/1.9; 358/3.2; 358/3.28; 358/533; 358/535; 358/536

(58) Field of Classification Search .................. 358/1.9, 358/3.06, 3.09, 3.11, 3.2, 3.28, 533–536; 347/107; 283/113
See application file for complete search history.

(56) References Cited

U.S. PATENT DOCUMENTS

| | | | |
|---|---|---|---|
| 4,149,183 A | | 4/1979 | Pellar et al. |
| 4,196,451 A | | 4/1980 | Pellar |
| 5,572,600 A | * | 11/1996 | Tajima et al. .................. 358/3.2 |
| 6,252,971 B1 | | 6/2001 | Wang |
| 6,798,539 B1 | | 9/2004 | Wang |
| 6,985,262 B2 | | 1/2006 | Wang |
| 7,268,920 B1 | * | 9/2007 | Ashworth .................. 358/3.2 |
| 7,480,076 B2 | * | 1/2009 | Wang .................. 358/1.9 |
| 7,639,391 B2 | * | 12/2009 | Ishii .................. 358/1.9 |
| 7,675,651 B2 | * | 3/2010 | Wang et al. .................. 358/3.06 |
| 7,679,787 B2 | * | 3/2010 | Wang et al. .................. 358/3.06 |
| RE41,604 E | * | 8/2010 | Ashworth .................. 358/3.2 |
| 2005/0243340 A1 | * | 11/2005 | Tai et al. .................. 358/1.9 |
| 2006/0170975 A1 | | 8/2006 | Wang |
| 2008/0151311 A1 | * | 6/2008 | Sharma et al. .................. 358/3.28 |
| 2009/0091795 A1 | * | 4/2009 | Wang .................. 358/3.06 |

* cited by examiner

*Primary Examiner*—Scott A Rogers
(74) *Attorney, Agent, or Firm*—Fay Sharpe LLP

(57) ABSTRACT

Systems and method for digitally reproducing a moiré-free color halftone output image having an embedded correlation-based digital watermark are provided using an enhanced halftone screen set consisting of a halftone screen for each of N colorants forming N color separations (where N≧3). The N different uniform rosette halftone screen configurations are generated such that each meets uniform rosette halftone screen conditions. A corresponding three-dimensional threshold array is generated for each halftone screen configuration having a phase shift value as an input. The color input image is halftoned, halftoning each one of the N different color separations using a corresponding halftone screen configuration and three-dimensional threshold array to form a moiré-free color output image having the correlation-based digital watermark embedded therein. A single key can be used to produce a full color image of the output image having the watermark image visible therein.

16 Claims, 14 Drawing Sheets

SYSTEM AND METHOD FOR THE GENERATION OF CORRELATION-BASED DIGITAL WATERMARKS USING UNIFORM-ROSETTE COLOR HALFTONING

CROSS-REFERENCE TO COPENDING APPLICATIONS

Attention is directed to co-pending applications: U.S. application Ser. No. 11/897,772 filed Aug. 31, 2007, entitled "SYSTEM AND METHOD FOR THE GENERATION OF CORRELATION-BASED DIGITAL WATERMARKS"; U.S. application Ser. No. 11/897,826 filed Aug. 31, 2007, entitled "SYSTEM AND METHOD FOR THE GENERATION OF MULTI-LAYER CORRELATION-BASED DIGITAL WATERMARKS"; U.S. application Ser. No. 11/848,908 filed Aug. 31, 2007, entitled "SYSTEM AND METHOD FOR THE GENERATION OF MULTIPLE ANGLE CORRELATION-BASED DIGITAL WATERMARKS"; U.S. application Ser. No. 11/565,470 filed Nov. 30, 2006 entitled "N-COLOR PRINTING WITH HEXAGONAL ROSETTES"; U.S. application Ser. No. 11/565,455 filed Nov. 30, 2006 entitled "ROSETTE PRINTING WITH UP TO FIVE COLORS"; U.S. application Ser. No. 11/565,434 filed Nov. 30, 2006 entitled "MOIRÉ-FREE COLOR HALFTONE CONFIGURATION EMPLOYING COMMON FREQUENCY VECTORS" the disclosure found in these co-pending applications are hereby incorporated herein by reference in its entirety. The appropriate components and processes of the above co-pending applications may be selected for the teaching and support of the present application in embodiments thereof.

BACKGROUND AND SUMMARY

Disclosed in embodiments herein are methods and systems for generation of a color watermarked image having a watermark embedded in different color channels of the image using halftone structures that meet a uniform-rosette condition, also referred to as minimum-rosette halftone screens. The color watermark can be retrieved, or viewed, using an overlaid reference key constructed with halftone structures meeting similar uniform-rosette conditions.

With the advent of inexpensive digital color printers, methods and systems of color digital halftoning have become increasingly important in the reproduction of printed or displayed images possessing continuous color tones. It is well understood that most digital color printers operate in a binary mode, i.e., for each color separation, a corresponding color spot is either printed or not printed at a specified image location or pixel. Digital color halftoning controls the printing of color spots, where the spatial averaging of the printed color spots by either a human visual system or a viewing instrument, provides the illusion of the required continuous color tones.

The most common halftone technique is screening, which compares the required continuous color tone level of each pixel for each color separation with one or more predetermined threshold levels. The predetermined threshold levels are typically defined for a rectangular cell that is tiled to fill the plane of an image, thereby forming a halftone screen of threshold values. At a given pixel if the required color tone level is darker than the threshold halftone level, a color spot is printed at that specified pixel. Otherwise the color spot is not printed. The output of the screening process is a binary pattern of multiple small "dots", which are regularly spaced as determined by the size, shape, and tiling of the halftone cell. Conventional screening outputs can be considered as two-dimensional repeated patterns, possessing two fundamental spatial frequencies, which are completely defined by the geometry of the halftone screens.

Halftoning images can also provide significant desirable visual effects. If two similar cluster halftone image patterns are superimposed on each other, the output can appear significantly different depending on the relative positions of the dot patterns as defined by their phase shifts.

Prior patents, such as U.S. Pat. No. 6,252,931 for "Digital watermarking using phase-shift stoclustic screens," by S. Wang, hereby incorporated herein by reference in its entirety, describe a method to embed correlation-based phase-shift digital watermarks, also referred to a correlation marks, into halftone screens. By overlaying a transparency on the prints generated by the special halftone screen, for example as a public key, an invisible watermark embedded in the image can be retrieved.

For example, the two checkerboard patterns, 100 depicted in FIG. 1A and 110 depicted in FIG. 1B, are essentially the same, except that the pattern 110 in FIG. 1B is a shifted version of the pattern 110 in FIG. 1A with an exactly "one-box width" shift. If the two patterns 100 and 110 are superimposed on each other with a perfect alignment, the result would be a completely black image as depicted by 120 in FIG. 1D. On the other hand, overlapping pattern 100 of FIG. 1A with itself, which can be considered another version of 100 with a zero-shift, gives an identical pattern to the original pattern 100, as depicted by 130 in FIG. 1C.

Referring now to FIGS. 2A-2C, a halftone pattern is shown at 200 having only it's central portion, shown as region 210, shifted in this manner. When the reference, or "public key", represented by the halftone pattern 240 of FIG. 2B is overlaid on top of the pattern 200, the result is clearly visible as a black central region shown at 250 in FIG. 2C. The example depicted in FIGS. 2A-2C is a simple demonstration for the phase-shift digital watermark technique. The shifted central part 210 in the picture may be considered a watermark, which is retrieved as a black circular digital watermark, or correlation mark, 250 in the overlay shown in FIG. 2C. The shift required for an optimal retrieval is equal to a half period of the halftone structure, or π, in a general mathematic term. The problem with a simple "insertion", however, is that the boundaries between the shifted portion 210 and the balance of the image can be quite visible as a seam 220 shown in FIG. 2A.

Several different approaches may be taken to extend the method for embedding phase-shift correlation-marks for the black/white images, describe above, to color halftoning.

First, it can be achieved by conducting dot-on-dot screening, i.e., applying the embedding to all color channels exactly the same way as for the black/white case. However, it is well known in color printing world that a dot-on-dot color halftoning configuration suffers from mis-registration between different color channels. Other drawbacks of the dot-on-dot configuration includes reduced color gamut compared with other configurations. Therefore, the dot-on-dot approach for correlation-marks is somewhat limited and many high-quality color printers use separate halftone screens with different angles and/or frequencies for different channels.

The second possible approach for embedding correlation-marks into color images is embedding the watermarks into different channels independently based on the geometries of halftone screens being used for each color. However, different keys, or overlay transparencies, are required to retrieve the watermarks for each of the individual colors. Also, this approach provides satisfactory results for instances when correlation-marks are embedded into areas where one of the primary colors is dominating and the transparency for watermark retrieval can be selected correspondingly. For areas with mixed colors, the contrast of the retrieved watermarks will be severely reduced if the images are halftoned by using different rotated screens. Thus, this second approach also has limited applications.

Furthermore, the superposition of halftone screens for color printing can create interference patterns, known as moiré, which can be seen in the image, thus detracting from the visual appearance of the halftoned image. Significant efforts have been undertaken to reduce the undesirable effects of moiré in color halftoning.

An aspect of the disclosed system and method provided extends use and formation of correlation marks by enabling mulit-color watermarked images to be formed by embedding a phase shifted (correlation-based) digital watermark into the color halftone used for each color separation, or channel, by halftoning the color input image with different one of a plurality of three-dimensional threshold arrays where at least one input thereto is a phase shift value using a different halftone structure for each channel. Each halftone structure is generated meeting uniform rosette conditions, also known as minimum rosette conditions. The color separations are combined to form an output color image having the digital watermark embedded therein but not visible to the unaided eye. A single common key, in the form of a transparency having a matching periodic structure, can be used to retrieve the watermark from the output color image producing a full color image of the output image having the watermark image visible therein.

Disclosed in embodiments herein is a method for digitally reproducing a moiré-free color halftone image having an embedded correlation-based digital watermark using an enhanced halftone screen set consisting of a halftone screen for each of N colorants forming N color separations (where $N \geq 3$), including providing a color input image to be watermarked; providing a watermark image to be embedded in the N-color image; generating N different uniform rosette halftone screen configurations each meeting uniform rosette halftone screen conditions; generating N three-dimensional threshold arrays each having a phase shift value as an input; and halftoning the color input image by halftoning N different color separations using a different one of the halftone screen configurations and three-dimensional threshold arrays for each color separation to produce a moiré-free color output image having the watermark image embedded therein.

Also disclosed in embodiments herein is a system for digitally reproducing a moiré-free color halftone image having an embedded correlation-based digital watermark using an enhanced halftone screen set consisting of a halftone screen for each of N colorants forming N color separations (where $N \geq 3$), including an input image source providing a color input image; image memory for storing the input image to be watermarked; watermark memory for storing the watermark image to be embedded in the color input image; and an image processor for generating N (where $N \geq 3$) different uniform rosette halftone screen configurations each meeting uniform rosette halftone screen conditions, generating N three-dimensional threshold arrays each having a phase shift value as an input, and halftoning the color input image by halftoning N different color separations using a different one of the halftone screen configurations and three-dimensional threshold arrays for each color separation to produce a moiré-free color output image having the watermark image embedded therein. Wherein, as disclosed herein, the uniform rosette halftone screen conditions include: defining rosette fundamental frequency vectors $V_{R1}$, $V_{R2}$ that satisfy a length and sum requirement to meet visual acceptability standards according to $|V_{R1}| > f_{min}$, $|V_{R21}| > f_{min}$, and $|V_{R1} \pm V_{R2}| > f_{min}$; defining N halftone screens for color separation i=1, N, respectively (where $N \geq 3$), possessing first and second frequency vectors $(V_{i1}, V_{i2})$, where no two screens possess identical fundamental frequency vector pairs; and selecting fundamental frequency vectors for the N halftone screens according to $(V_{i1}, V_{i2}) = (m_{i1}V_{R1} + m_{i2}V_{R2}, n_{i1}V_{R1} + n_{i2}V_{R2})$ for integer m's and n's, where for each color separation i, at least one fundamental frequency vector or its conjugate must also satisfy the following inequality: $|V_{ik}| > \max [|V_{R1}|, |V_{R2}|, \min[|V_{R1} + V_{R2}|, |V_{R1} - V_{R2}|]]$, k=1 or 2.

The various embodiments described herein are not intended to limit the invention to those embodiments described. On the contrary, the intent is to cover all alternatives, modifications, and equivalents as may be included within the spirit and scope of the invention as defined by the appended claims.

DETAILED DESCRIPTION

As more particularly set forth below, the disclosed system and methods are directed to the generation of color images having digital watermark, including generating color watermarked images using uniform-rosette halftone structures corresponding to different color channels such that the watermarks may be retrieved, or viewed, using the same public key overlaid atop the images.

Figure 1A:
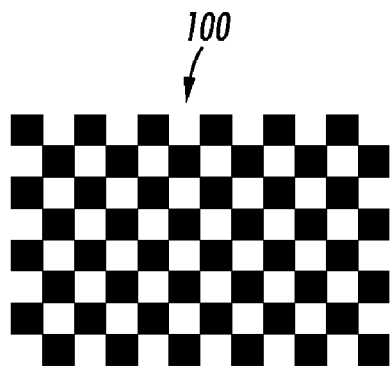
FIGS. 1A and 1B are exemplary representations of halftone patterns and FIGS. 1C and 1D illustrate the effect achieved by overlaying the patterns of FIGS. 1A and 1B.
Figure 1B:
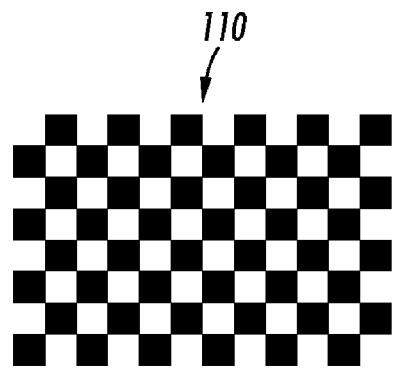
Figure 1C:
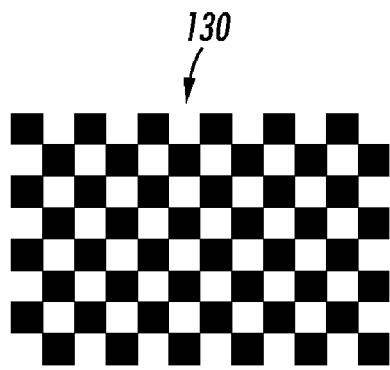
Figure 1D:
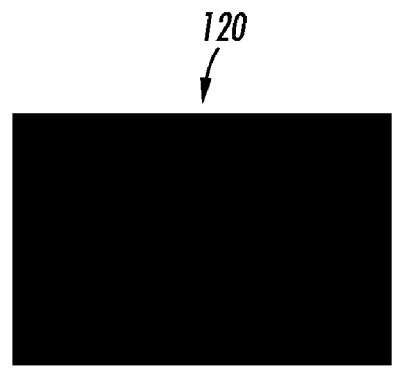
Figure 2A:
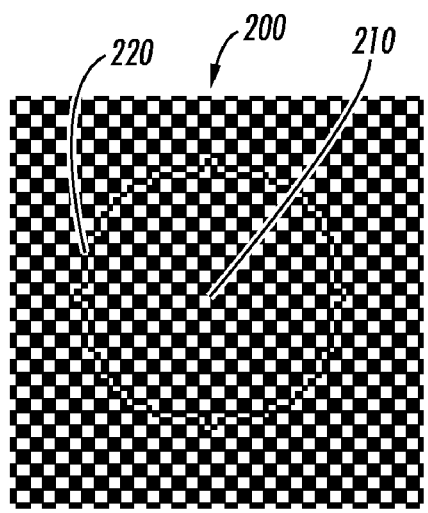
FIGS. 2A-2C are exemplary representations of an aspect of embodiments in the present invention showing the phase shifting of only a portion of a halftone image.

Referring again to FIG. 2A, the visibility of the seam 220 created between the phase shifted central portion 210 and the remainder of the halftone image 200 can be reduced by replacing the abrupt zero to π phase jump with a smooth phase transition. A smooth phase transition between 0 and π for the region 210 can be achieved by using a three-dimensional threshold array, as described in further detail below.

Figure 2B:
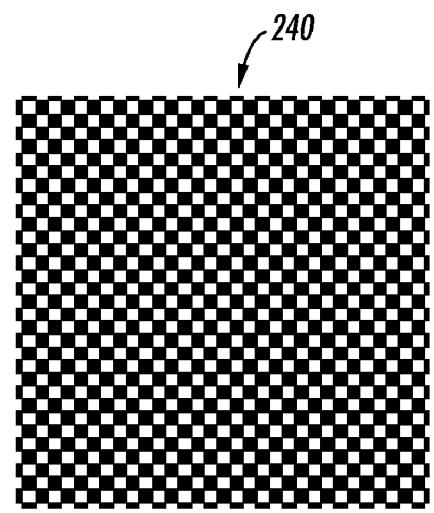
Figure 2C:
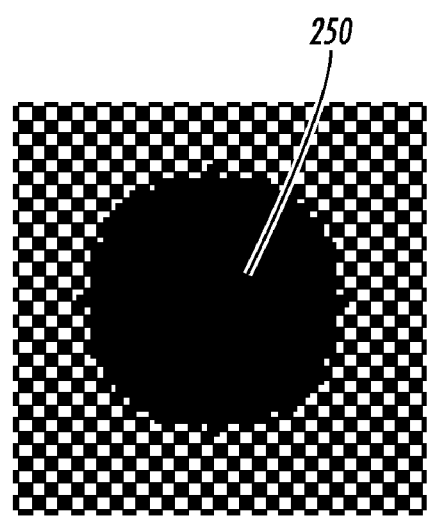
Figure 3A:
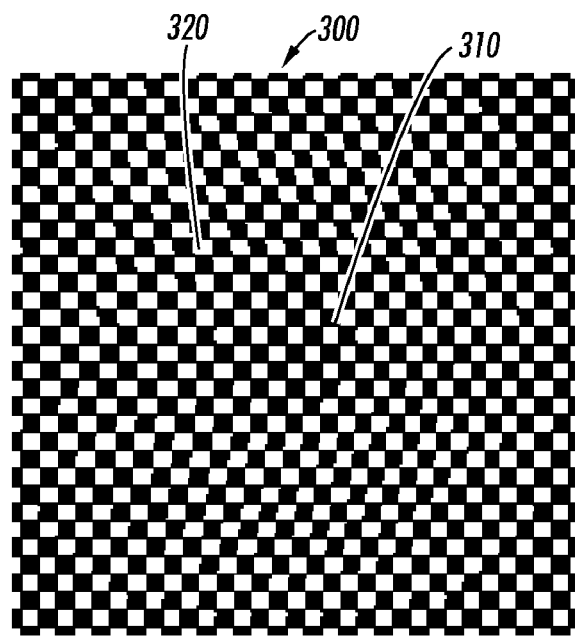
FIGS. 3A and 3B are representative examples of images processed in accordance with an aspect of the disclosed invention.
Figure 3B:
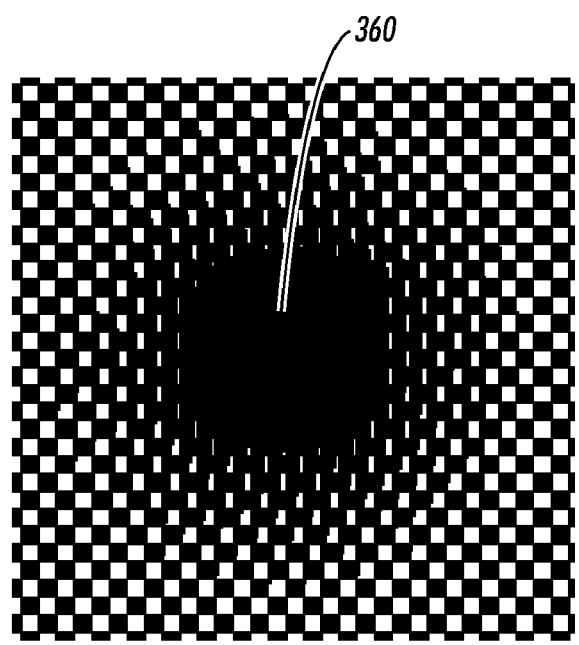

The halftone output with the embedded watermark pattern looks like the halftone pattern 300 shown in FIG. 3A. The boundary or seam 320 between the phased shifted central region 310 and the balance of the image is much less visible than the seam 220 in FIG. 2A. When a reference key, such as the pattern 240 of FIG. 2B is placed atop the halftone pattern 300 of FIG. 3A, a somewhat blurred circle, such as depicted in region 360 in FIG. 3B, will be retrieved as the digital watermark. Although the retrieved watermark 360 is somewhat blurred, in real applications, as demonstrated by samples with much higher resolutions, this technique provides large enough capacity for embedding very complex patterns as digital watermarks.

Figure 4A:
FIG. 4A illustrates a grayscale watermarked output image having an invisible watermark image embedded therein.
Figure 4B:
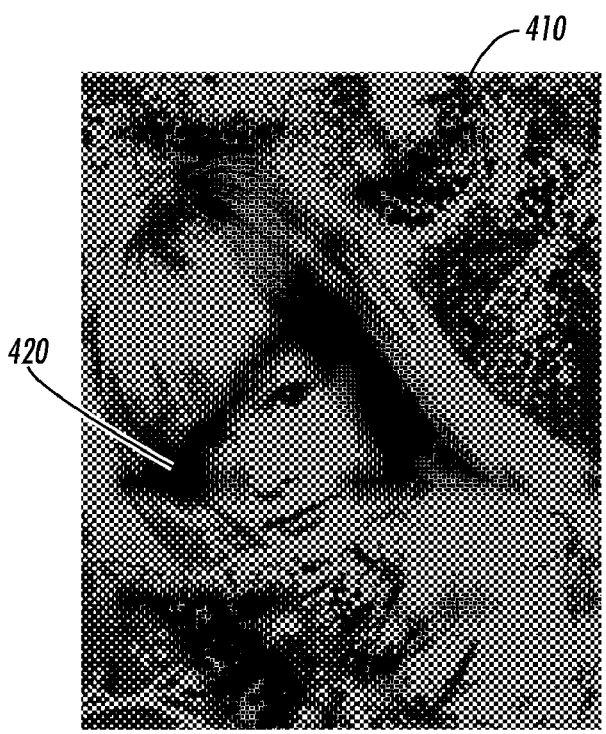
FIG. 4B illustrates a grayscale image retrieved from the output image of FIG. 4A having the watermark image visible therein.

For example, FIGS. 4A and 4B illustrate a black/white halftone image, shown generally at 400 having an embedded digital watermark that is not visible. The digital watermark 420 can be retrieved, such that it can be seen in the image 410, by placing a halftone structure forming a reference key, such as a transparency (not shown), on top of the image 400.

Extending this method for embedding phase-shift correlation-marks to color halftoning presents the issues with moiré, as described above, created by the superimposed color channel halftone screens. Moiré can be eliminated using uniform-rosette, also referred to as minimum rosette, halftone screens as disclosed in co-pending application U.S. application Ser. No. 11/565,470 filed Nov. 30, 2006 entitled "N-COLOR PRINTING WITH HEXAGONAL ROSETTES" previously incorporated by reference herein in its entirety. The disclosures provided therein supply teachings to systems and methods for digitally reproducing a moiré-free color halftone image using an enhanced halftone screen set consisting of a non-orthogonal halftone screen for each of N colorants (color channels), with N being 3 or greater, which meets a uniform-rosette condition.

Figure 5:
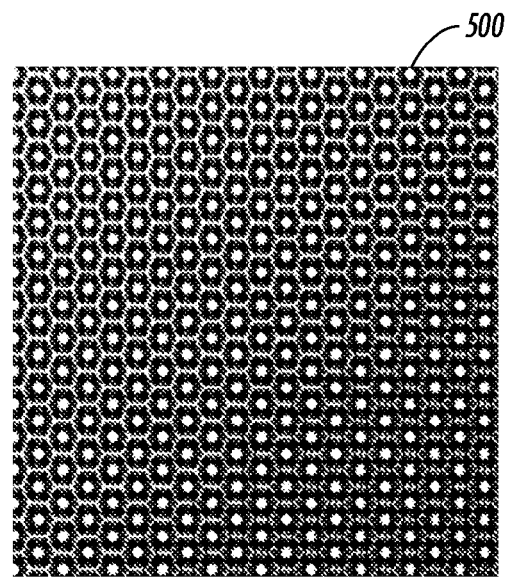
FIG. 5 illustrates the combination of multi-color channel halftones appearing as repeated rosettes with a uniform hexagonal shape.
Figure 6:
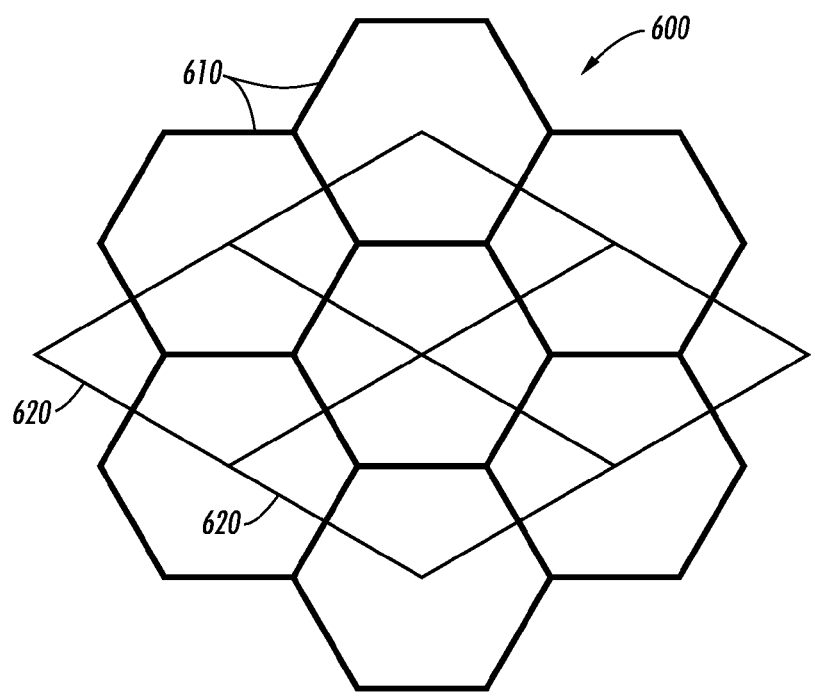
FIG. 6 illustrates how the repeated rosette pattern consisting of the tiled halftone screens of FIG. 5 can be viewed as regularly repeated hexagons or parallelograms.

When a uniform-rosette condition is satisfied, the combination of multi-color channel halftones appears as repeated rosettes with a uniform hexagonal shape 500 as shown FIG. 5. As shown in FIG. 6, the repeated rosette pattern 500, consisting of the tiled halftone screens, can be viewed as regularly repeated hexagons 610 or parallelograms 620. It has been found that this technique, as described in further detail below, can be used for embedding digital watermarks in color images.

Clustered-dot halftoning methods produce halftoned images that possess strong periodic structures defined by the halftone screens. For the purposes of moiré analysis, these images can be well described in the frequency domain by discrete components without regard to amplitude and phase. In the frequency domain representation, a two-dimensional halftone for a single colorant x forms a frequency lattice that can be described by two generator vectors $V_{x1}, V_{x2}$. The generator vectors correspond to the two fundamental frequencies of the halftone and can be referred to as fundamental frequency vectors. Linear combinations of these fundamental frequency vectors form all points (harmonics) in the lattice and no frequencies are formed that are lower than the fundamentals.

Moiré analysis for conventional color halftoning typically focuses on Cyan, Magenta, and Black. The fundamental vector frequencies can be denoted $V_{c1}, V_{c2}, V_{m1}, V_{m2}, V_{k1}$, and $V_{k2}$, respectively, where the sub 1 and sub 2 refer to vectors that are above (0° to 90°) or below (270° to 360°, or equivalently −90° to 0°) the 0° axis, respectively. This notation is used within the present disclosure to represent the two quadrants. Unless otherwise noted, the subscripts c, m, and k, are used to aid in teaching the presently described halftoning processes due to the common practice of three-color printing with cyan, magenta, and black however, the concepts are general in that other colorants may be used. For example, the notation $V_{m1}$ is referred to as a frequency vector for the magenta screen, it is to be understood that it can be intended generally to imply a frequency vector in the first quadrant for some available colorant. Further, colorants for particular screen geometries can be interchangeable. For example, cyan is halftoned with a screen of a first geometry, and black halftoned with a screen of a second geometry, but it is practical and reasonable to assume that the screens may be interchanged and cyan may be halftoned with the screen of the second geometry and black the first.

In color printing, the superposition of halftone screens creates more frequency components than exist in the single separations of the various individual process colors. The result caused by superposition of two different colors can be expressed as their frequency-vector difference, e.g., $V_{cm} = V_c \pm V_m$, where $V_c$ and $V_m$ are two frequency components from C and M, and $V_{cm}$ is the difference vector. Since each Fourier component has its conjugate, i.e., there is always a frequency vector $-V_c$ that represents the conjugate component of $V_c$, the sign definition of frequency vectors is somewhat arbitrary. For each halftone screen, there are two fundamental frequency vectors, therefore, the color mixing of two screens for two different colors yields eight difference vectors by the fundamental frequencies alone. Considering other harmonics of the halftone frequencies, the combinations can yield a large number of difference vectors.

Figure 7A:
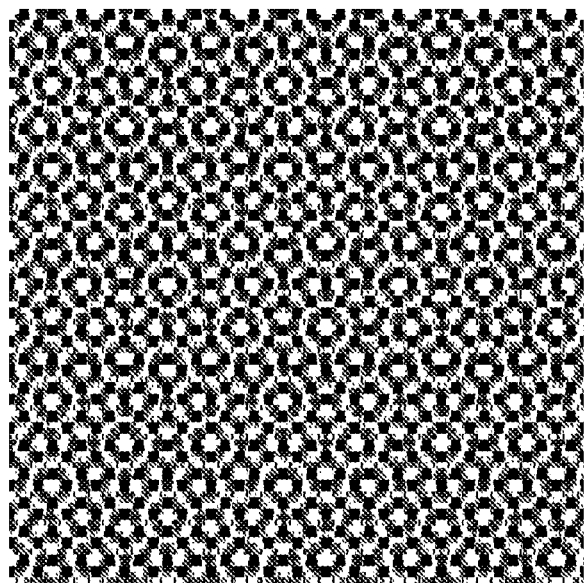
FIG. 7A illustrates how the superposition of halftone screens for three colors produces a rosette pattern.
Figure 7B:
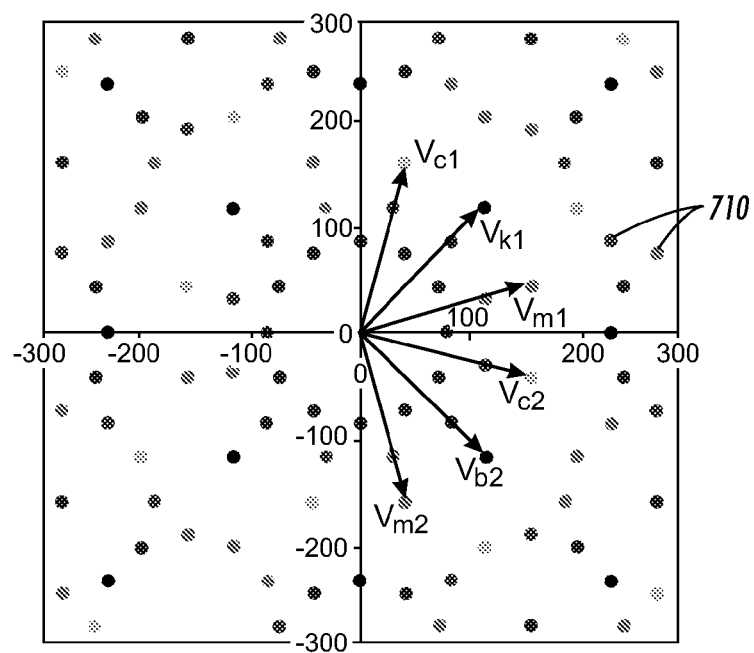
FIG. 7B illustrates how the Fourier transform frequency representation of the overlay of halftone screens shown in FIG. 7A is dominated by discrete frequency components shown as circular dots.

Referring now to FIGS. 7A and 7B, the superposition of halftone screens for three colors, typically C, M and K, based on a traditional configuration for a 170 cpi halftone screen set, produces a rosette pattern 700 in FIG. 7A. In these figures, the cyan halftone pattern is shown at 75°/−15°; magenta at 15°/−75°; and black at 45°/−45°.

FIG. 7B illustrates the Fourier transform frequency representation of this overlay which is dominated by discrete frequency components shown as circular dots, some of which are shown at 710. The discrete components are defined by the two fundamental halftone frequency vectors for each screen, $V_{c1}, V_{c2}, V_{m1}, V_{m2}, V_{k1}$, and $V_{k2}$, their two-dimensional higher-order harmonics (which can be considered to be linear combinations of the fundamentals), and linear combinations of components from different screens (which are beats, or forms of moiré). Note that phase is not represented in these plots and also there are many higher-order harmonics of the halftone frequencies that are not shown.

When using classical angles and frequencies, such as the traditional configuration for the 170 cpi halftone screen set, the rosette pattern 700 is not a simple repeated pattern. Rather, it has been shown that these rosette patterns 700 are theoretically non-periodic in that the same shape and configuration does not repeat on the same page. (J. A. C. Yule, "Principles of Color Reproduction")

Most halftone screens used in color reproduction are orthogonal screens, or screens in rectangular shapes including squares. However, for most digital printing devices, the size and shape of halftone screens are constrained by the "digital grid", which defines the locations of printed dots, and therefore, an exact 15° or 75° rotation of a cluster screen is impossible. Although there are many alternative approaches for moiré-free color halftoning, most of them only provide approximate solutions and/or have a tendency to generate additional artifacts associated with halftone outputs. The difficulty to achieve moiré-free color halftoning is greatly relieved by using non-orthogonal halftone screens, i.e., screens in general parallelogram shapes.

The common strategy to avoid objectionable two-color moiré is to select frequency vectors that ensure that no two-color difference vector of the fundamental halftone frequency vectors is sufficiently small, or short in length, to be perceived as a noticeably low frequency. The two-color moiré-free condition can be summarized by $$|V_c \pm V_m| > V_{high}, \quad (1)$$

where $V_c$ represents any one of $V_{c1}$, $-V_{c1}$, $V_{c2}$, $-V_{c2}$; $V_m$ represents any one of $V_{m1}$, $-V_{m1}$, $V_{m2}$, $-V_{m2}$; and $V_{high}$ is a frequency limit set at somewhere between 50-70 cycles-per-inch for just noticeable moiré.

It is well known that a troublesome moiré is the three-color moiré, which can appear in cyan-magenta-black prints produced by CMYK four-color printers. As an extension of the two-color case, one aspect of the three-color moiré-free condition can be summarized by $$|V_c \pm V_m \pm V_k| > V_{high}, \quad (2)$$

where $V_k$ represents any one of $V_{k1}$, $-V_{k1}$, $V_{k2}$, $-V_{k2}$; and $V_{high}$ is set similar to the two-color case. Since there are altogether thirty-two unique combinations of different color components for the left side of the inequality of Equation (2), it stands as a matter of practicality that to make all three-color difference vectors as well as all two-color difference vectors large enough to avoid any color moiré is very difficult, unless the halftone screens have very high frequency fundamentals, say higher than 200 line-per-inch. Another aspect of the moiré-free condition is to make two of the three-color difference vectors null while keeping the rest large. Given that both the signs and the indices of frequency vectors are defined somewhat arbitrarily, without losing the generality, the three-color moiré-free condition can be specified by the following vector equation:

$$V_{c1} - V_{m1} + V_{k2} = 0, \quad (3a)$$

or, equivalently due to the conventional screen configuration, $$V_{c2} - V_{m2} - V_{k1} = 0. \quad (3b)$$

The Equations (3a) and (3b), are two of all possible frequency combinations of the three colors. In most practical applications, the rest of the combinations satisfy the inequality of Equation (2) for $V_{high}$ as large as $\min[|V_c|, |V_m|, |V_k|]$ and are not specially specified, and the combination of halftone outputs produce a rosette appearance rather than objectionable moiré.

Most conventional halftone screens use square-shape halftone cells for tiling. Therefore, the two fundamental frequency vectors of each screen are not independent to each other. Once one of the two equations, either (3a) or (3b) is satisfied, the other one is automatically held. Recently, Wang et al. has taught halftone methods (U.S. Pat. No. 6,798,539, Wang et al.) using non-orthogonal halftone cells to construct halftone screens, or general parallelogram-shape halftone cells, for moiré-free color halftoning, in which case the two fundamental frequency vectors of each parallelogram-shape-based screen are independent to each other and thus satisfying both Equations (3a) and (3b) is required for the three-color moiré-free condition. We note that the term "non-orthogonal" as used in the present specification here refers to "not necessarily square," which is less restrictive than "strictly not orthogonal." Such terminology follows convention used in mathematics, where terms such as "non-linear" refers to "not necessarily linear."

Further concerning moiré-free non-orthogonal halftone configurations, Wang, in US Publication No. 2006/0170975 A1, disclosed a moiré-free color halftone configuration for clustered dots. Unlike conventional methods, the disclosed method produces periodic hexagon rosettes of identical shapes. These exemplary hexagon rosettes have three fundamental spatial frequencies exactly equal to half of the fundamental frequency of the three halftone screens. The resultant halftone outputs are truly moiré free, as all the fundamentals and harmonic frequencies are multiples of and thus higher in frequency than the rosette fundamental frequency.

An example of a hexagonal rosette halftone configuration is easy to understand through extension of the previous classical configuration illustrated in FIGS. 7A and 7B. Assume again halftone screens rotated to 15°, 45°, and 75°, respectively, for three different colors. In the present example, the halftones screens will satisfy Equation (3), but will be constructed of rectangular cells, rather than square cells. The halftones have similar appearances as the ones of the classical configuration with the difference being that the repeated halftone patterns in the current case is a rectangular cell with a ratio between the lengths of the two sides equal to 0.866, or exactly cos(30°). The frequency representations of the halftone patterns will show that fundamental frequencies vectors of each pattern are perpendicular to each other and the ratio of the two frequencies are also equal to cos(30°).

Figure 8A:
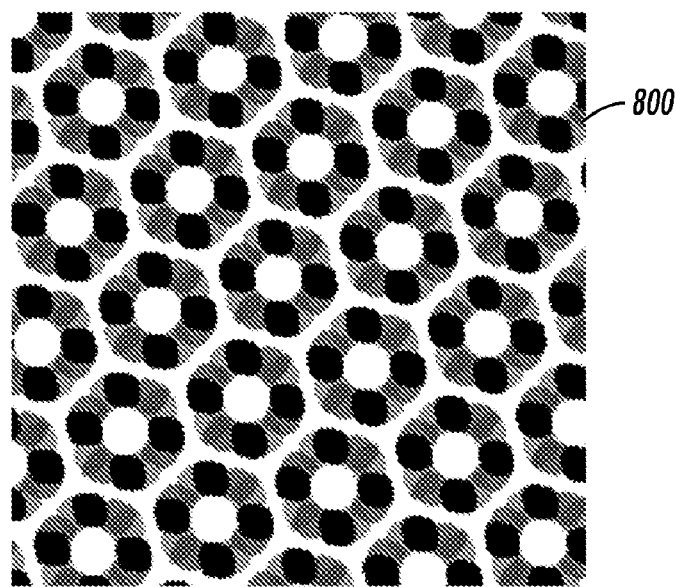
FIG. 8A illustrates the superimposition of three halftone patterns producing a uniform hexagonal rosette pattern.

As shown in FIG. 8A, the superimposition of these C, M, and K halftone patterns produces a hexagonal rosette pattern 800 which is much simpler and more uniform, than the rosette pattern 700 of FIG. 7A.

Figure 8B:
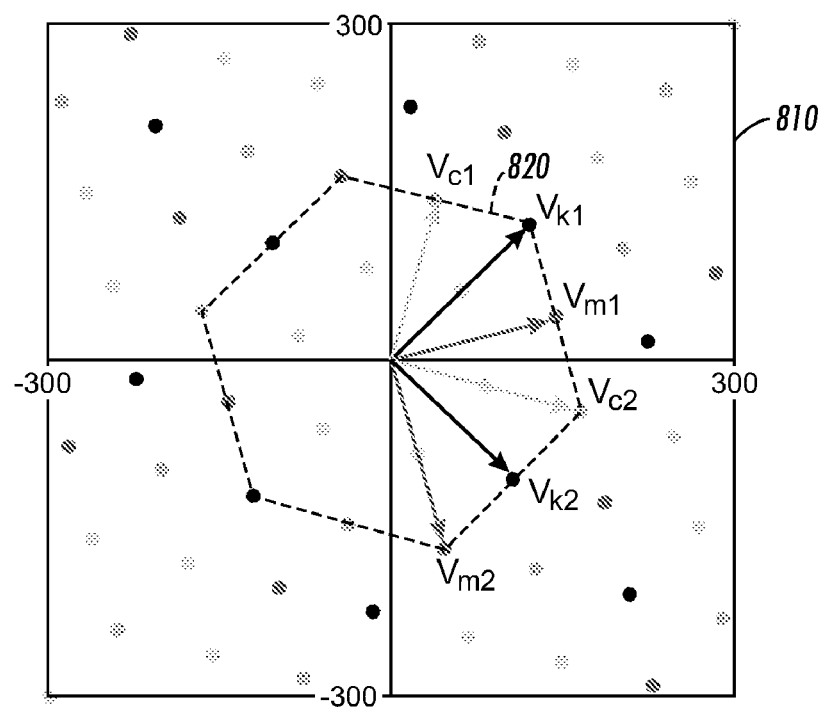
FIG. 8B, illustrates how the Fourier transform frequency representation of the overlay of halftone screens shown in FIG. 8A can be located on a hexagonal grid.

Further, as shown in FIG. 8B, all frequency components, including all fundamental frequencies and the respective harmonics of the monochromatic halftones, and frequencies due to all possible color combinations, can be located on a hexagonal grid in the Fourier representation shown at 810. The hexagonal grid can be seen by drawing a line connecting the nearest neighbors of any point in the spectra, as shown by the dashed line 820.

The halftoning method, and resulting configuration taught herein is based on defining rosette fundamental frequency vectors, of sufficiently high frequency and angle separation, that can be used to generate a hexagonal lattice of rosette harmonics. The lattice is generated by linear combinations of the rosette fundamental frequency vectors. Angles and frequencies for individual halftone screens are chosen from the rosette lattice points. A screen set selected in such a manner is moiré free because no combination of frequency lattice points can produce a beat lower than the two rosette frequency vectors used to generate the lattice. The lattice structure defined by the rosette makes it possible to choose pairs of frequency vectors for an almost arbitrary number of colorants without introducing any moiré in an N-color combination. Practical frequency lattices can be realized through the use of nonorthogonal screens.

Figure 9:
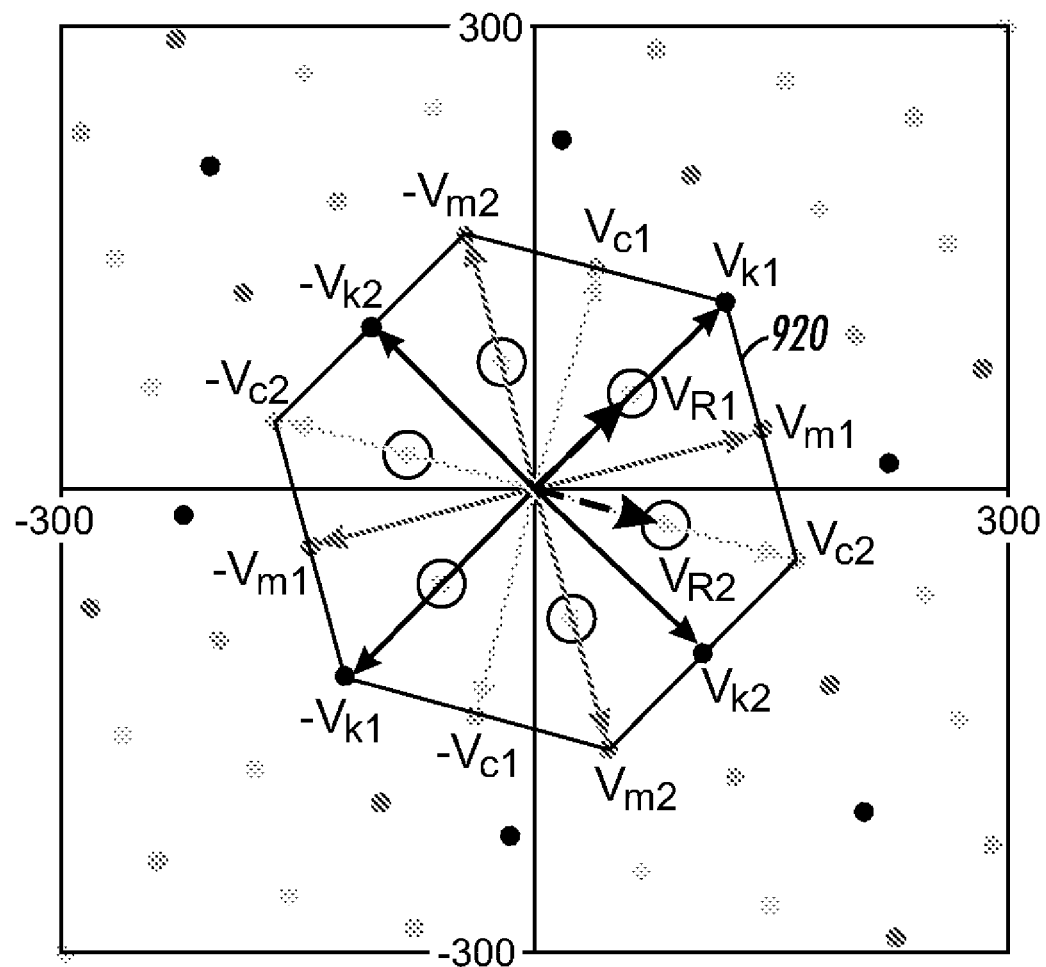
FIG. 9 illustrates that the set of all halftone fundamental frequencies form the vertices as well as define points that roughly bisect the sides of the hexagonal grid shown in FIG. 8B.
Figure 10:
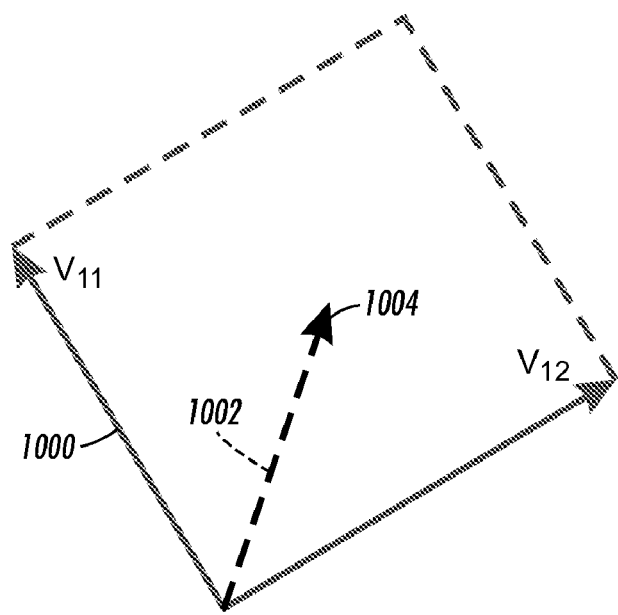
FIGS. 10-13 illustrate examples of spatial vectors representing halftone screen configurations meeting minimum rosette conditions as disclosed herein.
Figure 11:
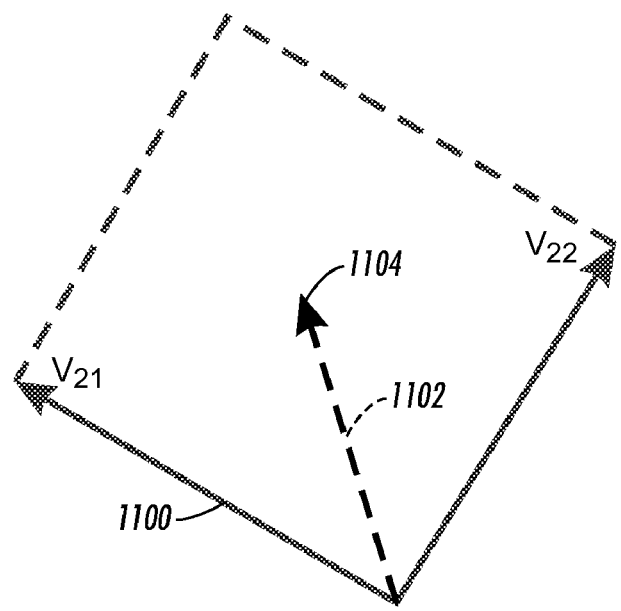
Figure 12:
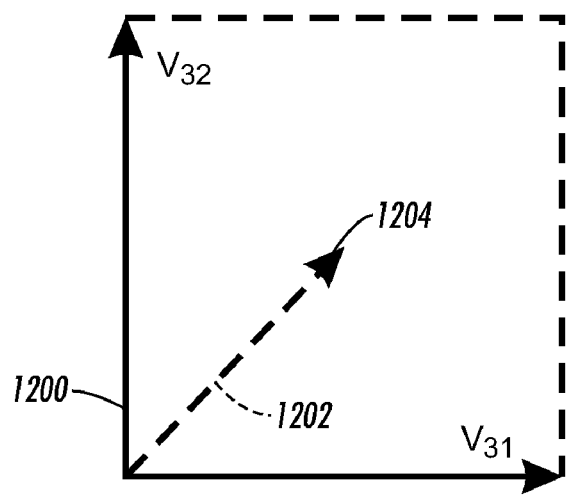
Figure 13:
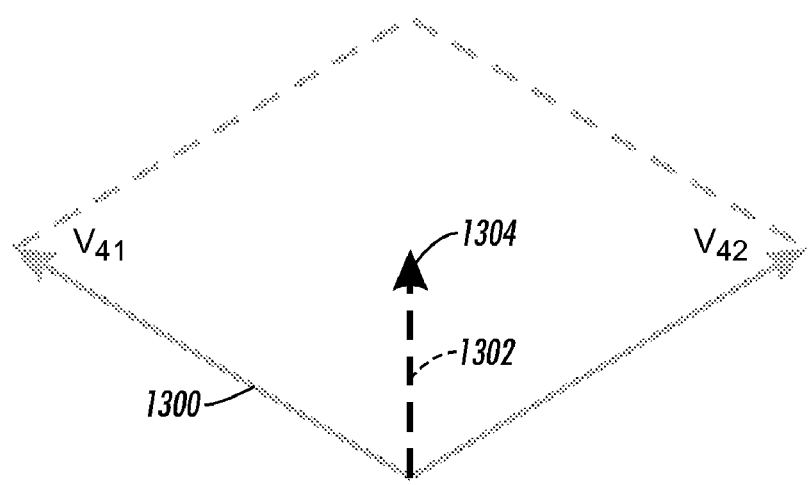

To better understand this rosette vector concept, consider the example of FIG. 8A, redrawn in FIG. 9 with rosette vectors $V_{R1}$, $V_{R2}$ shown as red dashed vectors, and the lowest frequency components of the rosette are shown as circles. Note that is it easy to see that the set of lowest frequency components form the vertices of a hexagon. The hexagon formed by the lowest frequency components can be referred to as the "first-order spectral hexagon." The relationships between the screen frequency vectors and rosette vectors are given by $$V_{c1} = 2V_{R1} - V_{R2}$$

$$V_{c2} = 2V_{R2}$$

$$V_{m1} = V_{R1} + V_{R2}$$

$$V_{m2} = -2V_{R1} + 2V_{R2}$$

$$V_{k1} = 2V_{R1}$$

$$V_{k2} = -V_{R1} + 2V_{R2}$$

The conjugate fundamental frequency vectors are also shown in FIG. 9. The figure shows that the set of all halftone fundamental frequencies can be connected to form a hexagon, illustrated at 920. The halftone fundamental frequencies form the vertices as well as define points that roughly bisect the sides of the hexagon. This hexagon connects the frequency components that lie just outside of the "first-order spectral hexagon and can be referred to as the "second-order spectral hexagon."

This teaching can be extended to derive new screen configurations with an arbitrary number (N) of halftone screen separations for use in embedding phase-shift correlation-marks with color halftoning.

A mathematical statement of the general principle of N-halftone lattice-based screen configurations can be written by considering a frequency lattice structure defined by rosette vectors $V_{R1}$, $V_{R2}$. To avoid objectionable low frequency texture and moiré we require $$|V_{R1}| > f_{min}, |V_{R2}| > f_{min}, \text{ and } |V_{R1} \pm V_{R2}| > f_{min}. \quad (4)$$

Typically, to meet visual acceptability standards, $f_{min}$ can be set to be approximately 100 cycles/inch. But, lower quality printed material could use $f_{min}$ as low as 50 cycles/inch, or lower, while high quality printed material might require $f_{min}$=150 cycles/inch.

For a screen configuration with N halftone screens, let $V_{i1}$, $V_{i2}$ respectively denote first and second fundamental frequency vectors for screens i=1, 2, ..., N, where $V_{i1}$, $V_{i2}$ are chosen to satisfy $$(V_{i1}, V_{i2}) = (m_{i1}V_{R1} + m_{i2}V_{R2}, n_{i1}V_{R1} + n_{i2}V_{R2}) \text{ for integer } m\text{'s and } n\text{'s.} \quad (5)$$

Exemplary halftone configurations are generated by utilizing configurations where halftone fundamental frequency vectors can be selected from any lattice points beyond the first-order spectral hexagon. To deviate from the fundamental rosette frequencies, for each color separation i, at least one fundamental frequency vector or its conjugate must also satisfy the following inequality: $|V_{ik}| > \max [|V_{R1}|, |V_{R2}|, \min [|V_{R1}+V_{R2}|, |V_{R1}-V_{R2}|]]$, k=1 or 2.

Often, it is desirable to avoid dot-off-dot/dot-on-dot configurations due to misregistration sensitivity. That can be achieved by specifying halftone fundamental frequency vectors such that any $(V_{i1}, V_{i2})$ vector pair is not equal to any other $(V_{j1}, V_{j2})$ vector pair. That is, no two screens possess identical fundamental frequency vector pairs. On the other hand, if dot-off-dot/dot-on-dot screens are desired, say for reasons of increased gamut or reduced texture, then at least one $(V_{i1}, V_{i2})$ vector pair is specified to equal another $(V_{j1}, V_{j2})$ vector pair.

It can be desirable to use screens that do not require large $|m|$ or $|n|$, say >6 or 8, because the frequency of those screens might be beyond the resolution of common printing processes, but note that certain high resolution processes (e.g., high resolution proofers) may allow a much higher frequency.

To achieve a balance between minimizing visibility and maximizing stability, it is often desirable to have particular screens at a relatively low frequency, but not as low as the rosette frequency. For example, screens for C, M, and K could be chosen such that $$2 \leq |m_{i1}| + |m_{i2}| + |n_{i1}| + |n_{i2}| \leq 4 \quad (6)$$

Line screens can be generated for a halftone configuration according to the teachings herein by selecting m's and n's such that one vector of the pair has length 0 ($|V_i|=0$).

For printing dot screens with 3 or more color separations it is typically desirable to have the rosette vectors $V_{R1}$, $V_{R2}$ separated by ≈30° or ≈60° to provide a pleasant hexagonal appearing rosette.

Thus, systems and methods for embedding phase shift digital watermarks with color halftoning, as described herein, include generating a plurality of halftone screen configurations, one for each color channel used in printing the final color image, created from the result of a uniform-rosette halftone screen design. An example set of clustered dot halftone screens that satisfies the uniform-rosette halftone design is provided below. In the present example, four halftone screens are chosen, one corresponding to each of four separate color channels, or color separations, used in forming the primary color output image 1500. However it should be appreciated that N halftone screen configurations can be used, corresponding to N separate color channels of the color image, where N≧3.

The four (4) halftone screen configurations for this exemplary halftone screen set, can be described by their fundamental frequency vectors $(V_{i1}, V_{i2})$ for i=1 to 4, or their corresponding spatial vectors $(v_{i1}, v_{i2})$ for i=1 to 4. The halftone screen configurations meeting the uniform-rosette halftone screen design are generated by defining rosette fundamental frequency vectors $V_{R1}$, $V_{R2}$ that satisfy a length and sum requirement to meet visual acceptability standards according to $|V_{R1}| > f_{min}$, $|V_{R2}| > f_{min}$, and $|V_{R1} \pm V_{R2}| > f_{min}$. Four halftone screens for colorants i=1 to 4, respectively, are defined, each possessing first and second frequency vectors $(V_{i1}, V_{i2})$, where no two screens possess identical fundamental frequency vector pairs. Fundamental frequency vectors are selected for the four halftone screens according to $(V_{i1}, V_{i2}) = (m_{i1}V_{R1} + m_{i2}V_{R2}, n_{i1}V_{R1} + n_{i2}V_{R2})$ for integer m's and n's, where for each color separation i, at least one fundamental frequency vector or its conjugate must also satisfy the following inequality: $|V_{ik}| > \max [|V_{R1}|, |V_{R2}|, \min[|V_{R1}+V_{R2}|, |V_{R1}-V_{R2}|]]$, k=1 or 2; so that the set of four different halftone screens used in combination produce moiré-free halftone output.

For this example, Color1 ($V_{11}, V_{12}$) will be used for cyan, Color2 ($V_{21}, V_{22}$) will be used for magenta, Color3 ($V_{31}, V_{32}$) will be used for black, and Color4 ($V_{41}, V_{42}$) will be used for yellow. All frequency components are measured in units of cycles-per-inch (cpi), and frequency angles are defined with respect to the horizontal y-axis.

Rosette: $V_{R1}$=90.1 cpi @ 56.3°,
$V_{R2}$=90.1 cpi, @ −56.3°
Color1: $V_{11}=2V_{R1}+V_{R2}$=167.7 cpi @ 26.6°,
$V_{12}=2V_{R2}$=180.2 cpi @ −56.3°
Color2: $V_{21}=2V_{R1}$=180.2 cpi @ 56.3°,
$V_{22}=V_{R1}+2V_{R2}$=167.7 cpi @ −26.6°
Color3: $V_{31}=V_{R1}-V_{R2}$=150 cpi @ 90°,
$V_{32}=2V_{R1}+2V_{R2}$=200 cpi @ 0°
Color4: $V_{41}=2V_{R1}$=180.2 cpi @ 56.3°,
$V_{42}=2V_{R2}$=180.2 cpi @ −56.3°

The spatial vectors ($v_{R1}, v_{R2}$) and ($v_{i1}, v_{i2}$) for i=1 to N, where N=4 corresponding to these frequency vectors (wherein lower case v is used to define the spatial vectors as distinguished from the corresponding frequency vectors defined by upper case V) are:

Rosette: $v_{R1}$ (−12, 8),
$v_{R2}$ (12, 8)
Color1: $v_{11}$ (−3, 6),
$v_{12}$ (6, 4)
Color2: $v_{21}$ (−6, 4),
$v_{22}$ (3, 6)
Color3: $v_{21}$ (6, 0),
$v_{32}$ (0, 8)
Color4: $v_{41}$ (−6, 4),
$v_{42}$ (6, 4)

The spatial vectors ($v_{R1}, v_{R2}$) and ($v_{i1}, v_{i2}$) for i=1 to N, where N=4, can be derived from the frequency vectors ($V_{R1}, V_{R2}$) and ($V_{i1}, V_{i2}$) for i=1 to N, where N=4, as taught by U.S. Pat. No. 6,985,262 to Wang, et al which is hereby incorporated herein by reference in its entirety. For the purposes of illustration, the spatial vectors ($v_{i1}, v_{i2}$) for i=1 to N, where N=4, each defining a minimum rosette halftone screen configuration to be used for a different color separation are shown at 1000, 1100, 1200 and 1300 in FIGS. 10-13 respectively.

Next, three-dimensional threshold arrays are generated, one for each uniform-rosette halftone screen configuration, to provide a smooth phase transition between 0 and π for portions of the halftone screens corresponding to the outer region of the digital watermark image as disclosed by co-pending applications: U.S. application Ser. No. 11/897,772 filed Aug. 31, 2007 entitled "SYSTEM AND METHOD FOR THE GENERATION OF CORRELATION-BASED DIGITAL WATERMARKS"; U.S. application Ser. No. 11/897,826 filed Aug. 31, 2007 entitled "SYSTEM AND METHOD FOR THE GENERATION OF MULTI-LAYER CORRELATION-BASED DIGITAL WATERMARKS"; and U.S. application Ser. No. 11/848,908 filed Aug. 31, 2007, entitled "SYSTEM AND METHOD FOR THE GENERATION OF MULTIPLE ANGLE CORRELATION-BASED DIGITAL WATERMARKS" previously incorporated herein by reference in their entirety. This outer region can be considered to correspond to the region 210 of FIG. 2A.

Unlike conventional halftoning techniques, the threshold value for a particular pixel in a particular color separation (or color channel) is not chosen from a halftone screen based solely on the spatial coordinates, x and y, of the pixel, but rather the digital watermark embedding method uses a separate three-dimensional threshold array for each color separation, each having an additional dimension specified by the phase shift, or more particularly the phase shift relative to an initial zero-shift halftone screen. During the halftone process, the threshold value for each pixel in each color separation is chosen from the corresponding three-dimensional array (e.g., array 1752 in FIG. 17) by specifying the spatial coordinates x and y, as well as a desired phase shift s. In the following discussion T(x,y) is employed to represent the halftone threshold value as a function of variables x, y and s.

For halftoning watermark images specified by 8 bits, or gray levels between 0 to 255, a common design of the two-dimensional threshold array with a given cluster geometry can be described mathematically as $$T(x,y)=128-127 \cdot \{ \cos[k\pi(x \cdot y_a + y \cdot x_a)] + \cos[k\pi(x \cdot y_b + y \cdot x_b)]\}/2, \quad (7)$$

where k is a scaling factor constant.

The equation, sometimes referred to as the dot profile, provides round-dot or round-hole shapes for the halftone outputs in the high light or the shadow part of an image, and checkerboard-like patterns for the middle tones. The dot profile T(x, y) in Equation 7 is used as the initial zero-shift halftone screen. The three-dimensional threshold array, which is also a function of the phase shift s used for watermark embedding, can be obtained by using a slight modification of Equation 7, and expressed as $$T(x,y)=128-127 \cdot \{ \cos[k\pi(x \cdot y_a + y \cdot x_a)+s] + \cos[k\pi(x \cdot y_b + y \cdot x_b)+s]\}/2, \quad (8)$$

where s is the phase shift in radians.

The resolution of the phase shift depends on the application. In general, a higher resolution provides better watermark hiding but requires larger memory space to store the three-dimensional array. For the purposes of this example, Ng is chosen to be equal to 255, which provides practical implementation of 8 bit images used in many applications. Ng can be chosen to be larger than 255 to provide greater resolution, or it may be less than 255 to require less memory to implement.

Therefore, it is possible to interpret the gray-levels in the watermark image in terms of desired amount of phase shift. To embed a watermark into each color halftone separation, a π shift for all the black areas of the watermark image and no shift for the white background of the watermark image is needed. Consider using 0 for the white and 255 for a complete black, we may interpret the white, or the gray level 0, as a zero phase shift and the complete black, or the gray level 255, as a π phase shift. In other words, $$s = g \cdot \pi / N_g, \quad (9)$$

where g is the gray level, Ng=255 is the total number of gray levels and s is the phase shift. A smooth phase transition can hide seams caused by the imposition of the watermark image, as described above.

Thus, four (4) three-dimensional threshold arrays T(x, y) each corresponding to a different color separation used in producing the color output image are generated by using the spatial coordinates x and y as the first two dimensions and the phase shift, represented by the variable s in Eq. (8), as the third dimension. Considering no phase shift as a black (0) and a full π-phase shift as a white (255), the phase shift s, varying from 0 to π as shown at 1002, 1102, 1202 and 1302 in FIGS. 10-13 respectively, can be represented as a gray level between the black (0) and the white (255).

The four (4) three-dimensional threshold arrays are then aligned so that for the position x=0 and y=0, the value of the phase shift s is also equal to zero.

The four (4) three-dimensional threshold arrays can then be stored in memory of a halftoning unit for use as described below. The threshold values for given x, y and s values can be calculated pixel-wise during the embedding process described below using Eq. 8, but storing a pre-calculated result into memory can reduce the processing time for the halftone process, if so desired.

A primary color image to be halftoned is then selected. The image is a multi-color (N-color) image, having N colors where $N \geq 3$. In the example provided herein, the image is a four-color image (N=4) using four separate halftone screen configurations, one for each color channel or separation to produce the output color image.

Figure 14A:
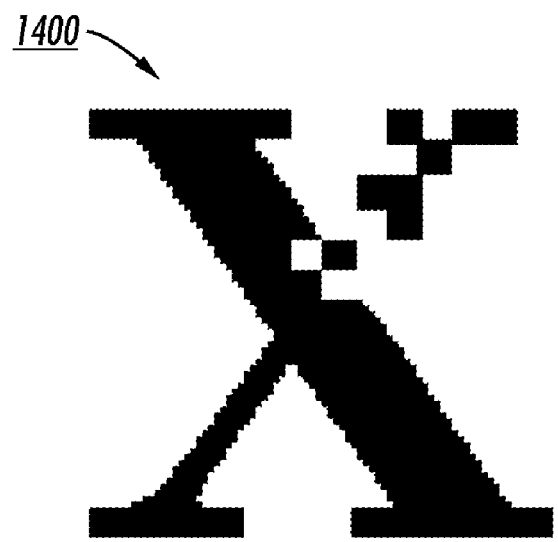
FIGS. 14A and 14B are representative illustrations of watermark images.

A black/white watermark image is selected to be embedded into the primary color image as a correlation-based watermark. For the purposes of example, a black/white Xerox logo image 1400 shown in FIG. 14A is used, however the image can be text, a drawing or any binary black/white pattern.

A 0 to π phase shift is then determined along all edges of the watermark image 1400 so that, in the image edges, all gray levels between 0 and Ng represent different intermediate phase shift steps between phase zero and phase π.

Figure 14B:
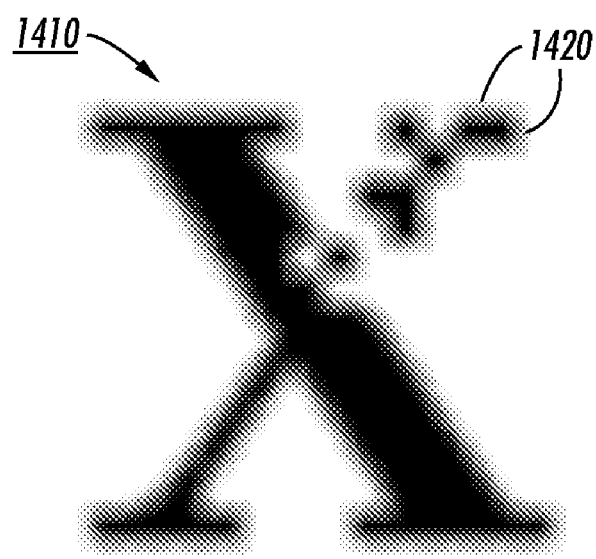

Referring to FIG. 14B, the desired phase transition can be represented by the watermark image 1410 having blurred edges as shown at 1420. It is produced from the original bi-level watermark image 1400, wherein all gray levels between 0 and 255 in the blurred edges of the image 1410 can be interpreted as intermediate steps between phase zero and phase π. The blurring process may be conducted using well-known low-pass filtering methods. The proper low-pass filters used in the process can be determined in practice by balancing the watermark hiding effect and the contrast of retrieved watermarks. Experimental results suggest that the area of the low-pass filter should be large enough to cover a plurality of clusters, more particularly at least about ten clusters, to provide a satisfactory result.

Figure 15A:
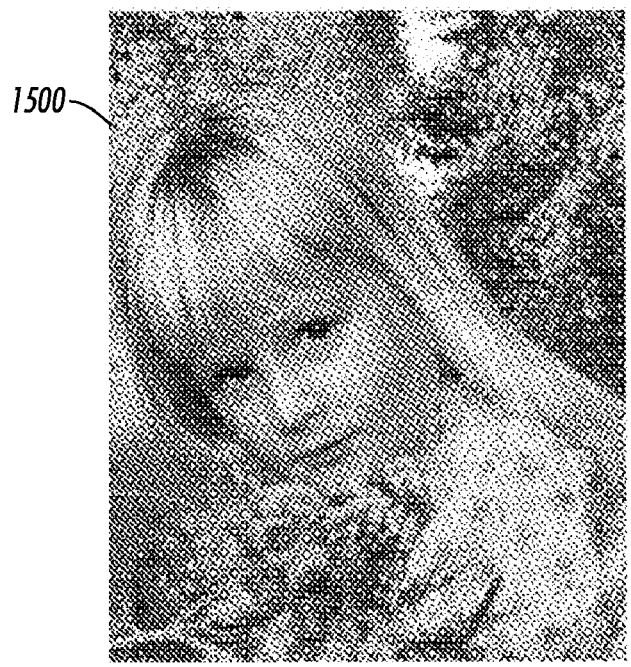
FIG. 15A is a grayscale representation of a color output image having a digital watermark embedded therein formed in accordance with the disclosed system and method.

Next, the primary color image is halftoned to embed the watermark image 1410 into the primary color image to produce an output color image having a correlation-based digital watermark shown at 1500 in FIG. 15A using a grayscale representation of the color image. Each color channel, or color separation, is halftoned using a different one of the minimum rosette halftone screen configurations ($v_{i1}$, $v_{i2}$) for i=1 to N (where N=4 in this example, as obtained above) by comparing the color input with the threshold value in the three-dimensional threshold array of the corresponding color channel for the spatial location (x, y) and the phase shift s at (x, y) as given by equation 9. The embedded watermark image 1410 is not visible with the unaided eye in the output color image 1500.

Figure 15B:
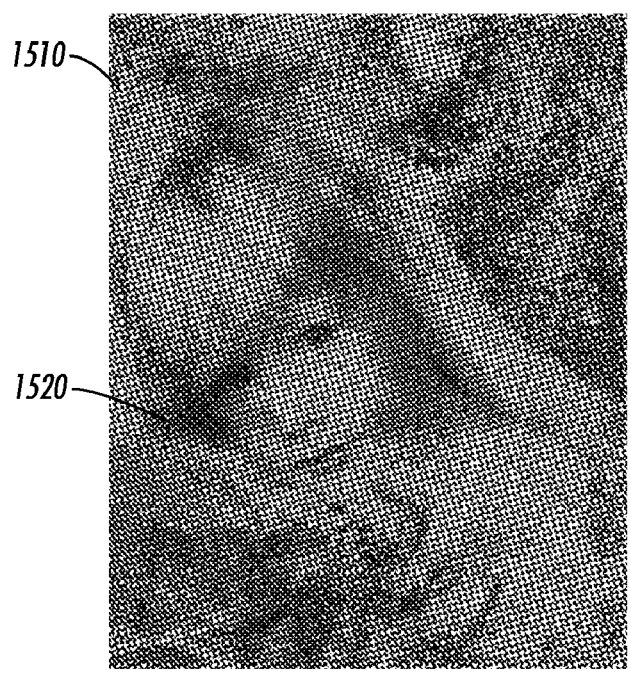
FIG. 15B is a grayscale representation of a full color image retrieved from the color output image of FIG. 15A having the watermark image visible therein as retrieved in accordance with the disclosed system and method.
Figure 16A:
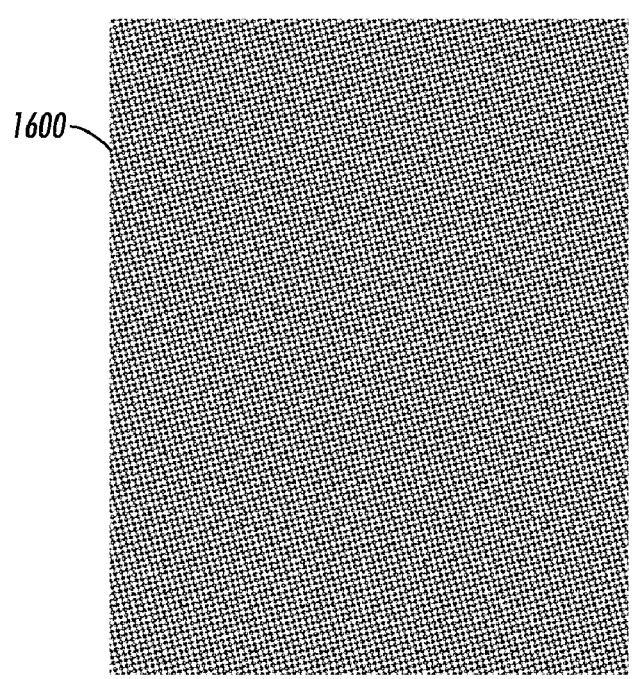
FIGS. 16A and 16B illustrate examples of keys for retrieving a full color image from the color output image having the watermark image visible therein.
Figure 16B:
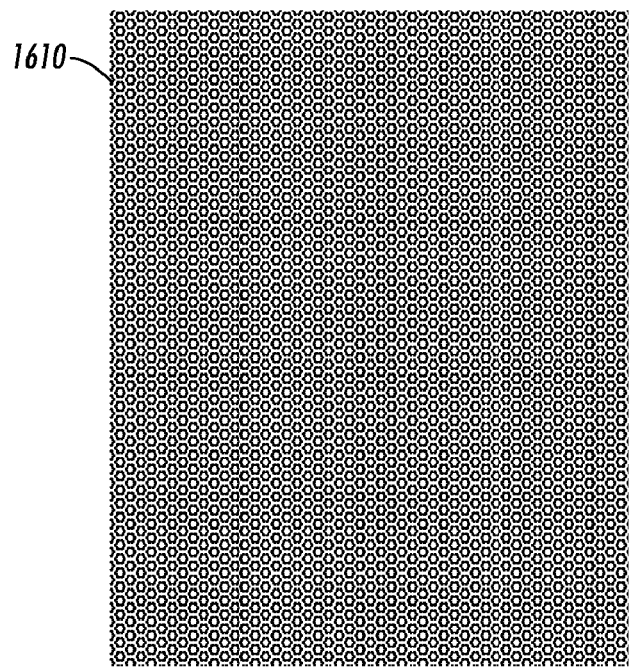

Referring to FIG. 15B, the watermark image 1410 can be retrieved, or viewed, using a key overlaid on top of the output color image 1500 creating a full color image 1510 of the output image, shown using a grayscale representation of the full color image, having the black/white watermark image visible therein as shown at 1520. The key, two examples of which are 1600 and 1610 in FIGS. 16A and 16B, is formed having a periodic structure matching the rosette patterns of the halftone structures described above. Since each hexagon 610 or parallelogram 620 produced by the overlaid multi-color halftoned separations used to form the output image 1500 contains exactly four cyan clusters, as well as four magenta, four yellow and four black clusters, it is possible to design a single common key 1600, 1610 for all of the N colors that can be used to retrieve the embedded correlation-mark 1520 in a full color image 1510 of the output image 1500. The common key 1600, 1610 can be formed with different periodic patterns, as long as they are periodic in structure matching the rosette patterns determined by the chosen halftone screens, such as for example using the rosette fundamental frequency vectors $V_{R1}$, $V_{R2}$ defined above. The patterns can be printed on a transparency to form the key which can then be overlaid on top of the output image for retrieval.

Figure 17:
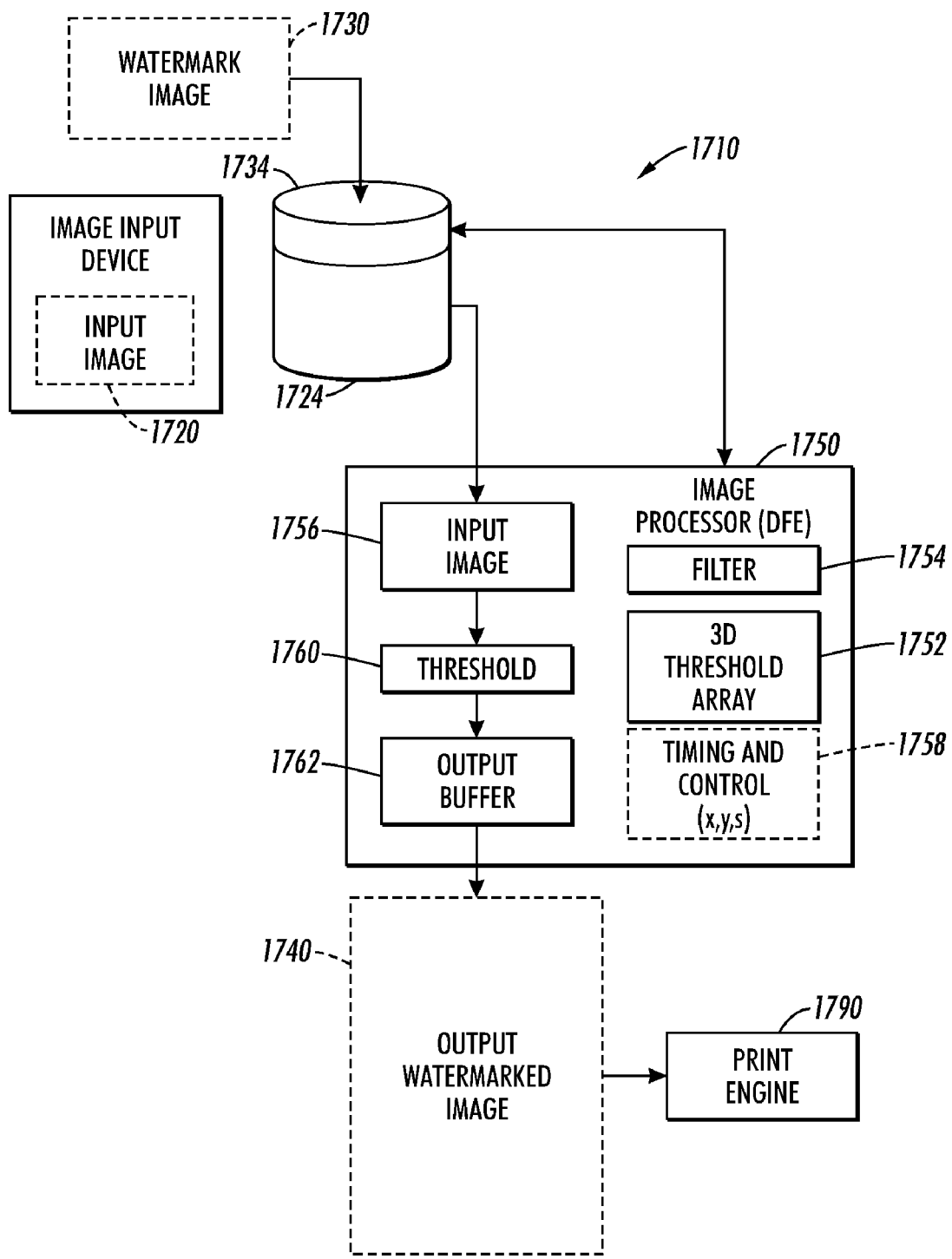
FIG. 17 is a block diagram depicting an embodiment of the system and related methods described herein.

Briefly, the watermark embedding process can be summarized as the series of steps generally illustrated in accordance with the block diagram of FIG. 17. FIG. 17 is an illustration of an exemplary image processing system 1710, suitable for carrying on digital watermarking of an input color image. The system 1710 includes an image input device, as a source of an N-color channel color input image 1720, such as a scanning device, a computer or image workstation for generating images, or a digital camera. The digital color input image is at least temporarily or partially stored in an image memory 1724. Memory 1724, although depicted as a hard disk, may be any suitable media or installed circuitry including RAM and ROM, removable and permanent and various combinations thereof as are commonly known and used for the storage of digital data such as images. As will be further appreciated the memory 1724 may be employed merely as a buffer just for the temporary storage of a portion of the image during processing as described herein.

Similarly, a watermark memory 1734 is employed for storing a black/white watermark image 1730 (1400). System 1710 further includes an image processor 1750 or similar control and processing circuitry, such as a digital front end (DFE) known for use in the processing of digital images for rendering on printing engines and reprographic devices (e.g., Xerox® iGen3™, DocuColor™ and WorkCentre™ systems, etc.). The processor 1750 is employed for embedding the digital watermark image 1730 into the input image 1720 to produce moiré-free digitally watermarked output image 1740, using halftone structures meeting the minimum rosette conditions described above.

As will be appreciated the output images 1500 may be rendered on any image output device such as a suitable marking or printing engine 1770 capable of rendering color output on one or more media.

The processor 1750 generates N different halftone screen configurations, one for each of the N different color separations which are combined to form the output color image 1740. Each halftone screen configuration meeting the minimum rosette configuration conditions which include: defining rosette fundamental frequency vectors $V_{R1}$, $V_{R2}$ that satisfy a length and sum requirement to meet visual acceptability standards according to $|V_{R1}|>f_{min}$, $|V_{R2}|>f_{min}$, and $|V_{R1} \pm V_{R2}|>f_{min}$; defining N halftone screens for color separations i=1, N respectively (where $N \geq 3$), possessing first and second frequency vectors ($V_{i1}$, $V_{i2}$), where no two screens possess identical fundamental frequency vector pairs; and selecting fundamental frequency vectors for the N halftone screens according to ($V_{i1}$, $V_{i2}$)=($m_{i1}V_{R1}+m_{i2}V_{R2}$, $n_{i1}V_{R1}+n_{i2}V_{R2}$) for integer m's and n's, where for each color separation i, at least one fundamental frequency vector or its conjugate must also satisfy the following inequality: $|V_{ik}|>$max $[|V_{R1}|, |V_{R2}|, \min[|V_{R1}+V_{R2}|, |V_{R1}-V_{R2}|]]$, k=1 or 2.

System 1710 also generates a plurality of three-dimensional (3D) threshold arrays T(x, y) 1752, each having a phase shift as an input value and corresponding to a different on of the N color separations used to form the output color image, as described above, and stores the result into memory. Alternatively, the threshold values for a plurality of given x, y and s values can also be calculated pixel-wise while halftoning each color separation using Equation (8) above. Storing the pre-calculated results into the processor memory, in 3D threshold arrays 1752 is intended for speeding up the halftone process. Accordingly, it will be appreciated that various halftone result generation and storage techniques may be employed in other alternative embodiments.

A low-pass filter 1754 may be applied to smooth out edges of the watermark image and the resultant image is then stored in memory as a multi-bit gray image (e.g., 8-bit), where the different gray levels represent different phase shifts for watermark embedding. If the original watermark pattern does not contain any high-frequency details this step may be omitted, if so desired.

The input image 1720 and the processed watermark image obtained previously are then read in by the image processor 1750 and a pixel-wise halftoning operation is conducted for each of the N color separations (color channels) used to form the output color image, such as the four color separations used in the example provided herein. In accordance with the disclosed embodiments, a different one of the three-dimensional threshold arrays 1752, stored in memory accessible to the processor 1750, is employed as an input to a threshold operation 1756 for each color separation. In response to input image location coordinates x and y, the input color value for a given color separation of the input image is compared to the threshold value determined by the coordinates x, y, and the phase shift s given by Equation (8), and a resulting gray level g is determined for a plurality of coordinate locations to produce each of the N color separations which are then combined to form the processed color output image 1740 having the correlation-based digital watermark image embedded therein.

As will be appreciated by those familiar with the design of image processing systems, the image processor 1750 further includes timing and control operation block 1758, which controls the flow of data and processing operations within the image processor, including any buffering of the image data as depicted in buffers 1760 and 1762. A wide variety of hardware may be employed to achieve the functionality depicted with regard to the image processor, including dedicated image processing chipsets and conventional computer workstations, as well as combinations thereof or other processing devices.

The watermarked color output image containing the embedded invisible digital watermarks, is then provided as input to the printing engine 1790 for rendering. A single public key 1600, 1610 can be used for retrieving the watermark producing a full color image 1510 of the output image 1500 having the watermark image 1520 visible therein.

It will be appreciated that various of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. An image forming method for digitally reproducing a moiré-free color: halftone image having an embedded correlation-based digital watermark using an enhanced halftone screen set consisting of a halftone screen for each of N colorants forming N color separations (where $N \geq 3$), the method comprising:
   providing a color input image to be watermarked;
   providing a watermark image to be embedded in the N-color image;
   generating N different uniform rosette halftone screen configurations each meeting uniform rosette halftone screen conditions;
   generating N three-dimensional threshold arrays each having a phase shift value as an input; and
   halftoning the color input image by halftoning N different color separations using a different one of the halftone screen configurations and three-dimensional threshold arrays for each color separation to produce a moiré-free color output image having the watermark image embedded therein.

2. The method of claim 1 wherein the step of generating N different uniform rosette halftone screen configurations each meeting uniform rosette halftone screen conditions, the uniform rosette halftone screen conditions further comprising:
   defining rosette fundamental frequency vectors $V_{R1}$, $V_{R2}$ that satisfy a length and sum requirement to meet visual acceptability standards according to $|V_{R1}| > f_{min}$, $|V_{R2}| > f_{min}$, and $|V_{R1} \pm V_{R2}| > f_{min}$;
   defining N halftone screens for color separations i=1, N respectively (where $N \geq 3$), possessing first and second frequency vectors $(V_{i1}, V_{i2})$, where no two screens possess identical fundamental frequency vector pairs; and
   selecting fundamental frequency vectors for the N halftone screens according to $(V_{i1}, V_{i2})=(m_{i1}V_{R1}+m_{i2}V_{R2}, n_{i1}V_{R1}+n_{i2}V_{R2})$ for integer m's and n's, where for each color separation i, at least one fundamental frequency vector or its conjugate must also satisfy the following inequality: $|V_{ik}| > \max[|V_{R1}|, |V_{R2}|, \min[|V_{R1}+V_{R2}|, |V_{R1}-V_{R2}|]]$, k=1 or 2.

3. The method of claim 2 further comprising generating a key having a periodic structure matching the rosette patterns using the rosette fundamental frequency vectors $V_{R1}$, $V_{R2}$ defined above.

4. The method of claim 3 further comprising retrieving the digital watermark by overlying the key on top of the color output image producing a color image of the output image having the watermark image visible therein.

5. The method defined in claim 1 wherein the three-dimensional threshold arrays are:

$$T(x,y)=128-127 \cdot \{\cos[k\pi(x \cdot y_a y \cdot x_a)+s]+\cos[k\pi(x \cdot y_b+y \cdot x_b)+s]\}/2$$

where s is the phase shift in radians.

6. A system for digitally reproducing an N (where $N \geq 3$) color channel moiré-free color halftone output image having an embedded correlation-based digital watermark, comprising:
   an input image source providing a color input image;
   image memory for storing the input image to be watermarked;
   watermark memory for storing the watermark image to be embedded in the color input image; and
   an image processor for generating N (where $N \geq 3$) different uniform rosette halftone screen configurations each meeting uniform rosette halftone screen conditions, generating N three-dimensional threshold arrays each having a phase shift value as an input, and halftoning the color input image by halftoning N different color separations using a different one of the halftone screen configurations and three-dimensional threshold arrays for each color separation to produce a moiré-free color output image having the watermark image embedded therein.

7. The method defined in claim 6 wherein $s=g \cdot \pi/N_g$, where g is the gray level of the watermark and $N_g$ is the total number of gray levels contained in the watermark.

8. The system of claim 6 wherein the step of generating N different uniform rosette halftone screen configurations each meeting uniform rosette halftone screen conditions, the uniform rosette halftone screen conditions further comprising:

defining rosette fundamental frequency vectors $V_{R1}$, $V_{R2}$ that satisfy a length and sum requirement to meet visual acceptability standards according to $|V_{R1}|>f_{min}$, $|V_{R2}|>f_{min}$, and $|V_{R1}\pm V_{R2}|>f_{min}$;

defining N halftone screens for color separation i=1, N, respectively (where N≧3), possessing first and second frequency vectors ($V_{i1}$, $V_{i2}$), where no two screens possess identical fundamental frequency vector pairs; and selecting fundamental frequency vectors for the N halftone screens according to ($V_{i1}$, $V_{i2}$)=($m_{i1}V_{R1}+m_{i2}V_{R2}$, $n_{i1}V_{R1}+n_{i2}V_{R2}$) for integer m's and n's, where for each color separation i, at least one fundamental frequency vector or its conjugate must also satisfy the following inequality: $|V_{ik}|>$max $[|V_{R1}|, |V_{R2}|,$ min$[|V_{R1}+V_{R2}|, |V_{R1}-V_{R2}|]]$, k=1 or 2.

9. The system of claim 8 further comprising generating a key having a periodic structure meeting the uniform rosette halftone screen conditions for retrieving the watermark from the N-color output image.

10. The system of claim 9 wherein the key is one of the N different uniform rosette halftone screen configurations.

11. The system of claim 9 wherein the key is not one of the N different uniform rosette halftone screen configurations.

12. The system of claim 9 further comprising retrieving the digital watermark by overlying the key on top of the color output image producing a color image of the output color image having the watermark image visible therein.

13. The system defined in claim 9 wherein the three-dimensional threshold arrays are:

$$T(x,y)=128-127\cdot\{\cos[k\pi(x\cdot y_a+y\cdot x_a)+s]+\cos[k\pi(x\cdot y_b+y\cdot x_b)+s]\}/2$$

where s is the phase shift in radians.

14. The system defined in claim 13 wherein $s=g\cdot\pi/N_g$, where g is the gray level of the watermark and $N_g$ is the total number of gray levels contained in the watermark.

15. A method of retrieving a correlation-based digital watermark embedded in an N-color channel color image using N halftone screens each meeting uniform rosette halftone screen conditions comprising:

overlying a key having a periodic halftone structure meeting a uniform rosette halftone screen condition on top of the color image.

16. The method defined in claim 15 wherein the uniform rosette halftone screen conditions comprise:

defining rosette fundamental frequency vectors $V_{R1}$, $V_{R2}$ that satisfy a length and sum requirement to meet visual acceptability standards according to $|V_{R1}|>f_{min}$, $|V_{R2}|>f_{min}$, and $|V_{R1}\pm V_{R2}|>f_{min}$;

defining N halftone screens for color separations i=1, N, respectively (where N≧3), possessing first and second frequency vectors ($V_{i1}$, $V_{i2}$), where no two screens possess identical fundamental frequency vector pairs; and selecting fundamental frequency vectors for the N halftone screens according to ($V_{i1}$, $V_{i2}$)=($m_{i1}V_{R1}+m_{i2}V_{R2}$, $n_{i1}V_{R1}+n_{i2}V_{R2}$) for integer m's and n's, where for each color separation i, at least one fundamental frequency vector or its conjugate must also satisfy the following inequality: $|V_{ik}|>$max $[|V_{R1}|, |V_{R2}|,$ min$[|V_{R1}+V_{R2}|, |V_{R1}-V_{R2}|]]$, k=1 or 2.

* * * * *